C. W. BEARDSLEY.
ELECTRIC RAT TRAP.
APPLICATION FILED NOV. 18, 1912.
1,074,770.
Patented Oct. 7, 1913.
2 SHEETS—SHEET 1.
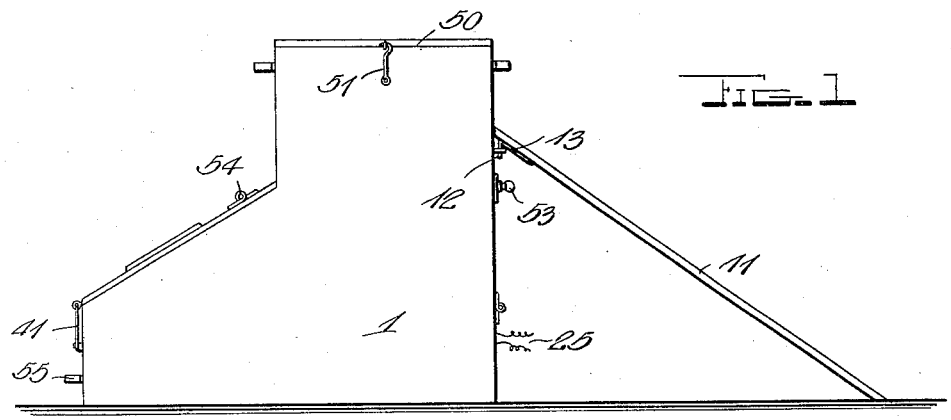
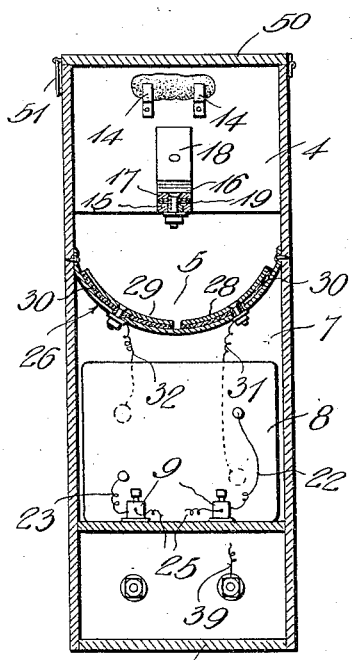
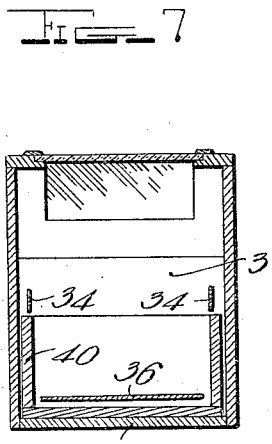
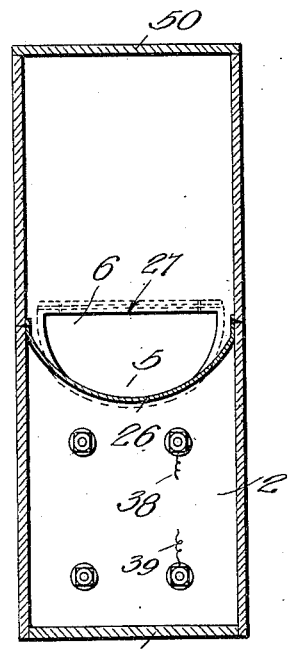
Witnesses
Inventor
C. W. Beardsley
By Attorneys C. W. BEARDSLEY.
ELECTRIC RAT TRAP.
APPLICATION FILED NOV. 18, 1912.
1,074,770.
Patented Oct. 7, 1913.
2 SHEETS—SHEET 2.
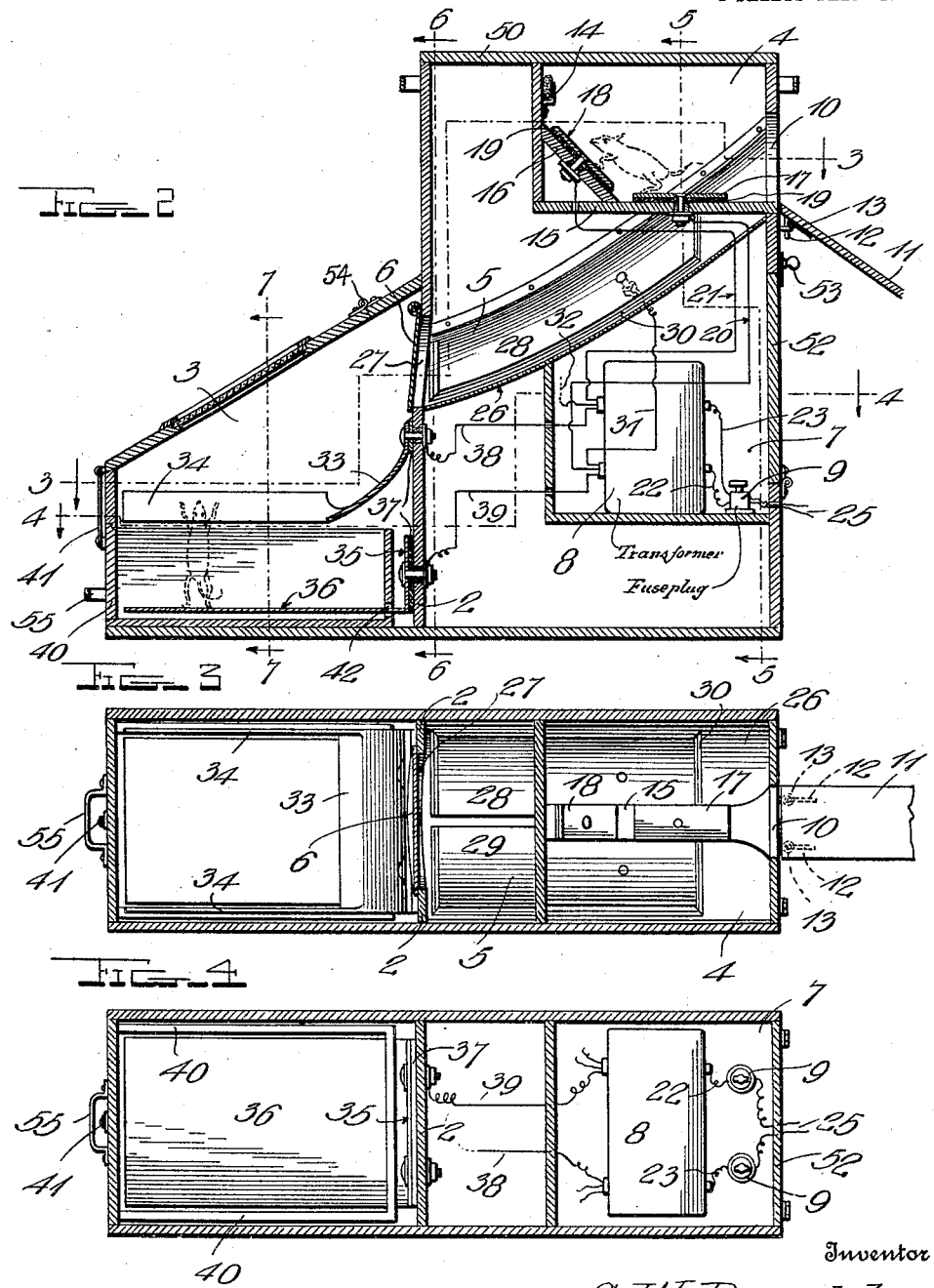

UNITED STATES PATENT OFFICE.

CLAUDE WILLIAM BEARDSLEY, OF TACOMA, WASHINGTON.

ELECTRIC RAT-TRAP.

1,074,770.  Specification of Letters Patent.  Patented Oct. 7, 1913.

Application filed November 18, 1912. Serial No. 732,068.

*To all whom it may concern:*

Be it known that I, CLAUDE WILLIAM BEARDSLEY, a citizen of the United States, residing at Tacoma, in the county of Pierce and State of Washington, have invented certain new and useful Improvements in Electric Rat-Traps; and I do declare the following to be a full, clear, and exact description of the invention, such as will enable others skilled in the art to which it appertains to make and use the same.

This invention relates to traps, and more especially to those in which the animal caught is electrocuted; and the object of the invention is to make certain that the rat or other animal is dead before passing him into what might be called the morgue, and to provide the latter with means for giving the victim a final shock in case he should withstand the shocks previously administered. This object is carried out by constructing the trap in the manner hereinafter more fully described and claimed, and as shown in the drawings wherein—

Figure 1 is a side elevation of this trap complete, and Fig. 2 is a central vertical longitudinal sectional view on a larger scale, showing the wiring in diagram only. Figs. 3 and 4 are horizontal sections on the lines 3—3 and 4—4 of Fig. 2, respectively; and Figs. 5, 6 and 7 are vertical sections on the lines 5—5, 6—6 and 7—7 of Fig. 2 respectively.

In the drawings the body 1 of this trap is shown as divided by an upright partition 2 into a forward portion and a rearward portion or chamber which may well be called the morgue 3, and the forward portion is sub-divided by proper partitions into what might be called the electrocuting chamber 4, the chute or passageway 5 which leads to the morgue through a gate or door 6 so hinged that it will lie normally closed and prevent the rat being trapped from receiving odors from those in the morgue, and an additional chamber 7 for the transformer 8 and the fuse plugs 9. The front of the electrocuting chamber 4 is provided with an opening 10 to which leads an inclined approach 11 whose outer end may rest upon the floor and whose inner end may have hooks 12 removably engaging eyes 13 in the front wall of the body whereby the whole approach can be detached when the trap is not in use.

The rear wall of the electrocuting chamber 4 carries a bait holder 14 disposed at an elevated point, and the floor of this chamber is formed by a narrow strip or bridge 15 leading straight to the rear from the bottom of the inlet opening 10, and an inclined strip 16 leading upward from said lower strip or bridge 15 to the rear wall at a point just beneath the bait holder. These two strips act as supports for electric terminals 17 and 18 as of copper or the like, which are secured fixedly upon and insulated from the strips by fiber or asbestos sheets 19 as shown in Fig. 2 and are separated slightly from each other, and the terminals are respectively connected with the transformer 8 by means of wires 20 and 21. It follows that when a rat or other animal crawls up the approach 11 and passes through the opening 10, he steps upon the terminal plate 17, and—seeing the bait at 14—his impulse is to reach for it; in doing so he moves along the bridge and steps upon the terminal 18, and immediately he receives an electric shock because his body then closes a circuit through the two wires 20 and 21 and the transformer 8. The latter is energized by electric wires 22 and 23 passing through fuse plugs 9 to an ordinary house circuit 25 which is commonly charged at about 110 volts, and if the transformer is of the step-up variety the power of the house circuit will be transformed sufficiently to kill an ordinary rat who may close the circuit between the terminals 17 and 18. As shown the narrower bridge 15 intersects the chute 5 adjacent its upper end, whereby should the animal become unbalanced on said bridge before he reaches the electric terminal 18 mounted upon the inclined strip 16, he will fall into the chute and will be electrocuted before he is deposited into the morgue.

The chute chamber or compartment 5 has a bottom 26 inclined downward from a point beneath the inlet opening 10 to an opening 27 through the partition 2, which opening is closed by the door 6, and this bottom 26 is by preference made of metal and curved transversely as seen in Fig. 6.

Secured upon it are metallic terminals 28 and 29, insulated from each other slightly and separated from the bottom 26 by means of fiber or asbestos sheets 30, and these terminals are connected respectively by wires 31 and 32 with the transformer 8. It follows that when the rat is killed or even shocked within the electrocuting chamber 4, he falls off the rather narrow bridge 15 constituting the bottom thereof and drops onto one of the plates forming the terminals along the chute, and then rolls to the bottom thereof where his body overlaps the other plate so that he receives a second shock as he slides down the chute and passes through the door 6. If for any reason the current should be weak or the transformer should not be acting properly, it may be that the initial shock will only stun the rat; in fact he may have been crowded off the bridge by other rats and not shocked at all thereon. Hence I provide for this second shock in order to kill him before he passes out of the forward portion of the casing.

Within the rear chamber or morgue 3 and secured to the rear face of the upright partition 2 is a terminal consisting of a plate 33 of copper or the like which is bent to the rear as seen in Fig. 2 and then bisected and divided into two arms 34 standing on edge within the side walls of this chamber 3 but out of contact therewith; and secured to said partition 2 at a lower point is a second plate 35 which extends downward to a point near the bottom of the casing, and then straight to the rear as at 36—both these plates being insulated from the partition by fiber or asbestos 37, and respectively connected with the transformer by wires 38 and 39 as seen in Fig. 2.

The numeral 40 designates a drawer sliding into the rear of the casing over its bottom and preferably hooked as at 41 in closed position, and the inner end of this drawer has a slot 42 through which the horizontal portion 36 of the plate 35 projects as the drawer is pushed into place; it results that said horizontal portion 36 constitutes the bottom of the drawer when the latter is in place, but remains in the casing when the drawer is withdrawn so that its own bottom then comes into use. It follows that the animals which are shocked in the forward portion of the casing and delivered to the rear through the door 6, drop between the arms 34 of the fork onto the false bottom 36 of the drawer 40, and should it so happen that they are not yet dead any one which might arise as indicated in Fig. 2 and reach upward and touch one of the arms 34 will thereby close a circuit through the plates 33 and 37 and receive a shock from the transformer.

In the event that it is not possible to connect the wires 25 with an ordinary house circuit, and the person using this trap employs some other source of electricity which may not be so strong or may in time grow weak, any rodent receiving sufficient shock upon the bridge to cause him to fall off the same into the chute will be trapped, or any rat crowded off the bridge will be trapped. This follows from the fact that he slides down the chute and through the door 27, and the latter immediately closes behind him; and no rat within the morgue can escape, even though the electric circuit should fail entirely. Thus it will be seen that I have made provision for killing the rodents and other animals with absolute certainty, even though the current should be poor or the transformer imperfect. As they never touch the bait it will not be necessary to replace it, but for gaining access thereto and to the interior of the casing I provide a hinged top 50 and a catch 51. Also I would hinge the front panel 52 of the casing and latch this panel as at 53, thereby providing means for permitting access to the chamber containing the transformer and the fuses. In like manner the top of the rear chamber or morgue 3 may be hinged as at 54, and the same hook 41 which holds the drawer in place could hold this top closed. When this hook is detached or disconnected from the drawer, the latter can be drawn outward by means of a handle 55 to discharge the dead animals. It will not be necessary to specify the materials or proportions of parts, and changes in details may be made without departing from the principle of my invention. If it should so happen that the electric current is not led from the ordinary house system, it will be necessary for the user to supply a transformer 8 which will operate successfully with whatever current is used; but ordinarily the supply wires will lead to a plug which can be screwed into any socket in the house system, by first removing the incandescent lamp therefrom.

What is claimed as new is:

The herein described animal trap comprising a casing having an inlet opening through its front wall, a transverse partition within the casing having an opening at a lower level than said inlet opening, a transversely dished chute inclined downwardly from the inlet opening to the opening in the partition, a receptacle at the lower end of the chute and a gate between the chute and the receptacle, a bridge narrower than the chute secured to the front wall of the casing at the bottom of the inlet opening and extending toward the opening in the partition, said bridge intersecting the upper end of the chute and having an inclined strip forming a continuation thereof, metallic plates secured to the bridge and to the inclined strip and separated from each other, a lure mounted immediately above the inclined strip, and means for connecting said plates with the terminals of an electric circuit.

In testimony whereof I have hereunto set my hand in presence of two subscribing witnesses.

CLAUDE WILLIAM BEARDSLEY.

Witnesses:
BROWN POE,
JOHN M. BOYLE.